(12) United States Patent
Kim et al.

(10) Patent No.: US 10,401,550 B2
(45) Date of Patent: Sep. 3, 2019

(54) BACK-LIGHT UNIT AND DISPLAY APPARATUS COMPRISING SAME

(71) Applicant: LG CHEM, LTD., Seoul (KR)

(72) Inventors: Nari Kim, Daejeon (KR); Byeong In Ahn, Daejeon (KR); Dong Mok Shin, Daejeon (KR); Ji Ho Kim, Daejeon (KR); Joo Yeon Seo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/531,847

(22) PCT Filed: Feb. 1, 2016

(86) PCT No.: PCT/KR2016/001088
§ 371 (c)(1),
(2) Date: May 31, 2017

(87) PCT Pub. No.: WO2016/122284
PCT Pub. Date: Aug. 4, 2016

(65) Prior Publication Data
US 2017/0261673 A1    Sep. 14, 2017

(30) Foreign Application Priority Data
Jan. 31, 2015  (KR) ........................ 10-2015-0015706

(51) Int. Cl.
*F21V 8/00*    (2006.01)
*G02F 1/1335*  (2006.01)

(52) U.S. Cl.
CPC .......... *G02B 6/005* (2013.01); *G02B 6/0055* (2013.01); *G02F 1/133615* (2013.01); *G02F 2001/133614* (2013.01); *G02F 2001/133624* (2013.01)

(58) Field of Classification Search
None
See application file for complete search history.

(56) References Cited

U.S. PATENT DOCUMENTS

| 6,252,254 B1 | 6/2001 | Soules et al. |
| 9,678,254 B2 * | 6/2017 | Ryu ........................ G02B 5/223 |
| 2006/0103589 A1 * | 5/2006 | Chua .................... G02B 6/0023 345/3.1 |
| 2008/0037282 A1 | 2/2008 | Kurihara |

(Continued)

FOREIGN PATENT DOCUMENTS

| JP | 2001-184910 A | 7/2001 |
| JP | 2002-531956 A | 9/2002 |

(Continued)

*Primary Examiner* — Elmito Breval
(74) *Attorney, Agent, or Firm* — Dentons US LLP (57) ABSTRACT

The invention described in the present specification relates to a backlight unit including a light source including a light emission lamp emitting light including a 450 nm wavelength, and an inorganic fluorescent substance provided at least a part of inside or on a surface of the lamp and having a maximum light emission wavelength in a 510 nm to 560 nm range when irradiating light including a 450 nm wavelength; and a color conversion film including an organic fluorescent substance, and having a maximum light emission wavelength in a 610 nm to 660 nm range when irradiating light emitted from the light emission lamp or the inorganic fluorescent substance, and a display apparatus including the same.

8 Claims, 5 Drawing Sheets

(56) References Cited

U.S. PATENT DOCUMENTS

| | | | |
|---|---|---|---|
| 2012/0113671 A1 | 5/2012 | Sadasivan et al. | |
| 2013/0265522 A1* | 10/2013 | Jung | G02F 1/1336 349/61 |
| 2014/0071381 A1* | 3/2014 | Jang | G02B 6/0051 349/64 |
| 2015/0295112 A1* | 10/2015 | Okura | C09K 11/02 136/257 |
| 2016/0011355 A1* | 1/2016 | Kokudo | G02B 6/0023 349/62 |
| 2016/0104821 A1* | 4/2016 | Hino | G02F 1/133514 362/293 |
| 2016/0161088 A1* | 6/2016 | Sung | H01L 33/502 362/97.1 |

FOREIGN PATENT DOCUMENTS

| | | |
|---|---|---|
| JP | 2007-178902 A | 7/2007 |
| JP | 2008-041550 A | 2/2008 |
| JP | 2011-241160 A | 12/2011 |
| KR | 10-2002-0014130 A | 2/2002 |
| KR | 10-2008-0020840 A | 3/2008 |
| KR | 10-2013-0064653 A | 6/2013 |
| KR | 10-2014-0143060 A | 12/2014 |
| TW | 201213980 A1 | 4/2012 |

* cited by examiner

BACK-LIGHT UNIT AND DISPLAY APPARATUS COMPRISING SAME

TECHNICAL FIELD

This application is a National Stage Entry of International Application No. PCT/KR2016/001088, filed on Feb. 1, 2016, and claims the benefit of and priority to Korean Application No. 10-2015-0015706, filed on Jan. 31, 2015, all of which are hereby incorporated by reference in their entirety for all purposes as if fully set forth herein.

BACKGROUND ART

As large area televisions become more common, televisions are also becoming high-definition, slimmer and highly functional. High performance and high definition OLED TVs still have a problem of price competitiveness, and real markets for OLED TVs have not yet begun. Accordingly, efforts to similarly secure advantages of OLEDs with LCDs have been continuously made.

As one of the efforts, many quantum dot-related technologies and prototypes have been recently incorporated.

However, cadmium-based quantum dots have safety problems such as restrictions on the use, and therefore, interests in manufacturing back lights using quantum dots without cadmium, which has relatively no safety issues, have been rising.

DISCLOSURE

Technical Problem

The present application provides a backlight unit having excellent color gamut and a display apparatus including the same.

Technical Solution

One embodiment of the present application provides a backlight unit including a light source including a light emission lamp emitting light including a 450 nm wavelength, and an inorganic fluorescent substance provided at least a part of inside or on a surface of the lamp and having a maximum light emission wavelength in a 510 nm to 560 nm range when irradiating light including a 450 nm wavelength; and a color conversion film including an organic fluorescent substance, and having a maximum light emission wavelength in a 610 nm to 660 nm range when irradiating light emitted from the light emission lamp or the inorganic fluorescent substance.

According to another embodiment of the present application, a photon number ratio of blue light and green light of light emitted from the light source when applying power to the backlight unit of the embodiments is in a range of 55:45 to 30:70.

According to another embodiment of the present application, the organic fluorescent substance has a maximum light emission wavelength in a 610 nm to 660 nm range in a film state, and a light emission peak has a full width at half maximum (FWHM) of 70 nm or less in a film state.

According to one embodiment of the present application, a light guide plate is provided between the light source and the color conversion film of the backlight unit described above.

According to another embodiment of the present application, the color conversion film of the backlight unit described above is a color conversion film including a resin matrix; and an organic fluorescent substance dispersed in the resin matrix, and absorbing light emitted from the light source and emitting light having a different wavelength.

Another embodiment of the present application provides a display apparatus including the backlight unit according to the embodiments described above.

Advantageous Effects

A backlight unit according to embodiments described in the present invention includes a green inorganic fluorescent substance in a light source using a blue light emission lamp, and includes a red organic fluorescent substance in a color conversion film, and accordingly, is capable of obtaining white color having excellent color gamut with a light source and one color conversion film.

MODE FOR INVENTION

A backlight unit according to one embodiment of the present application includes a light source including a light emission lamp emitting light including a 450 nm wavelength, and an inorganic fluorescent substance provided at least a part of inside or on a surface of the lamp and having a maximum light emission wavelength in a 510 nm to 560 nm range when irradiating light including a 450 nm wavelength; and a color conversion film including an organic fluorescent substance, and having a maximum light emission wavelength in a 610 nm to 660 nm range when irradiating light emitted from the light emission lamp or the inorganic fluorescent substance. The light emission lamp may be described as a blue light emission lamp, the inorganic fluorescent substance as a green inorganic fluorescent substance, and the organic fluorescent substance as a red organic fluorescent substance. A maximum light emission wavelength of the color conversion film may be determined depending on types of the organic fluorescent substance or types of a matrix resin forming the film. The color conversion film preferably has a maximum light emission wavelength in 610 nm to 650 nm.

Figure 1:
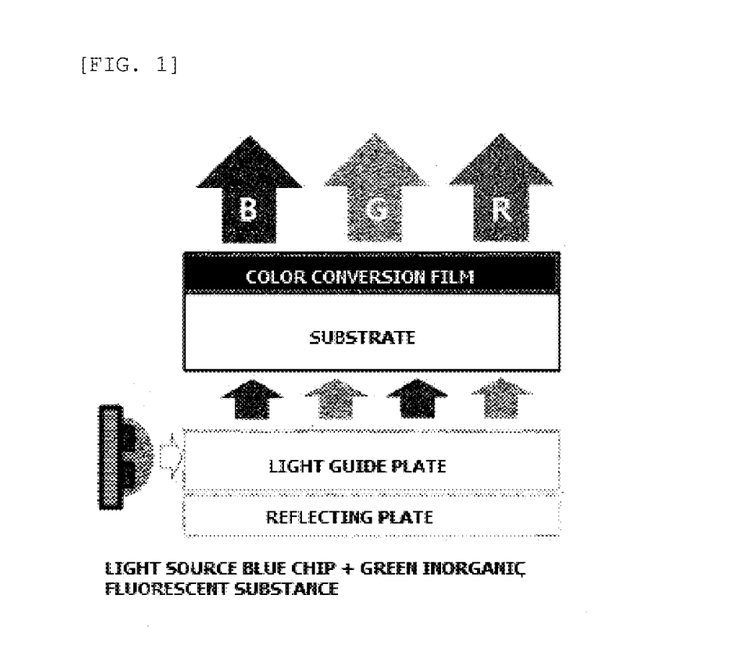
FIG. 1 is a mimetic diagram illustrating a structure of a backlight unit according to one embodiment of the present application.

FIG. 1 shows a mimetic diagram of a structure of the backlight unit according to the embodiment. The light source of the backlight unit according to FIG. 1 includes a blue light emission lamp including a blue chip, and a green inorganic fluorescent substance. FIG. 1 shows a diagram of an etch-type light source in which a light guide plate is provided between the light source and the color conversion film, and the light source is located on a side surface of the light guide plate. In addition, a reflecting plate is provided on a back side of the light guide plate. However, the scope of the present invention is not limited to FIG. 1, and a direct-type light source may be used, or two or more light sources may be provided. The color conversion film according to FIG. 1 is provided on a substrate. The substrate may perform a role of a support when preparing the color conversion film, or may perform a role of a barrier film depending on the materials used. The color conversion film according to FIG. 1 includes a red organic fluorescent substance and light diffusing particles. Light diffusing particles are not an essential component, however, luminance may increase without extra films when the color conversion film includes light diffusing particles.

According to another embodiment of the present application, a photon number ratio of blue light and green light of light emitted from the light source when applying power to the backlight unit of the embodiments is in a range of 55:45 to 30:70. When a photon number ratio of blue light and green light is included in the above-mentioned range, a white color coordinate may be readily set. The blue light means having a maximum light emission wavelength in a 400 nm to 500 nm wavelength range, and the green light means having a maximum light emission wavelength in a 500 nm to 600 nm wavelength range.

According to another embodiment of the present application, the red organic fluorescent substance has a maximum light emission wavelength in a 610 nm to 660 nm range in a film state, and has a light emission peak with a FWHM of 70 nm or less in a film state. Generally, unlike an inorganic fluorescent substance having a large FWHM, color gamut may further increase by using a red organic fluorescent substance having a FWHM of 70 nm or less as described above. Such a red organic fluorescent substance is preferably a pyrromethene metal complex series.

The blue light emission lamp included in the light source may be a blue LED.

The green inorganic fluorescent substance included in the light source may be included in the lamp using methods such as coating on the inside or outside the lamp, or adding into the lamp.

An amount of the green inorganic fluorescent substance used may be determined depending on intensity of the blue light, types of the green inorganic fluorescent substance, types of the red organic fluorescent substance and the like.

The green inorganic fluorescent substance may include SiAlON series, gallium nitride, silicon carbide, zinc selenide, GaAlAsP and the like, but is not limited thereto.

According to another embodiment of the present application, the color conversion film is a color conversion film including a resin matrix; and a red organic fluorescent substance dispersed in the resin matrix, and absorbing light emitted from the light source and emitting red light.

As the red organic fluorescent substance, a red organic fluorescent substance having a maximum light emission wavelength in a 610 nm to 660 nm range in a film state, and having a light emission peak with a FWHM of 70 nm or less in a film state may be used. When the maximum light emission wavelength is in the above-mentioned range in a film state and the light emission peak has a small FWHM of 70 nm or less in a film state, high color gamut is capable of being obtained. It is more favorable as the red organic fluorescent substance has a light emission peak with a smaller FWHM.

In the present specification, the FWHM means a width of a light emission peak at a half of the maximum height in a maximum light emission peak of the light emitting from the organic fluorescent substance. In the present specification, the FWHM at light emission peak may be measured in a film state. Herein, the "film state" means, instead of a solution state, a state prepared to a film form with the organic fluorescent substance alone or by mixing the organic fluorescent substance with other components that do not affect FWHM measurement.

According to one embodiment of the present application, pyrromethene metal complex series, rhodamine series, DCM series or perylenedimide series fluorescent substances may be used as the red organic fluorescent substance.

As the red fluorescent substance, compounds of the following Chemical Formula 1 may be used as the pyrromethene metal complex series.

[Chemical Formula 1]

$R_{11}$, $R_{12}$ and L are the same as or different from each other, and each independently hydrogen, an alkyl group, a cycloalkyl group, an aralkyl group, an alkylaryl group, an alkenyl group, a cycloalkenyl group, an alkynyl group, a hydroxyl group, a mercapto group, an alkoxy group, an alkoxyaryl group, an alkylthio group, an arylether group, an arylthioether group, an aryl group, a haloaryl group, a heteroring group, halogen, a haloalkyl group, a haloalkenyl group, a haloalkynyl group, a cyano group, an aldehyde group, a carbonyl group, a carboxyl group, an ester group, a carbamoyl group, an amino group, a nitro group, a silyl group or a siloxanyl group, or are linked to adjacent substituents to form a substituted or unsubstituted aromatic or aliphatic hydrocarbon ring or heteroring,

M is a metal having a valency of m, and is boron, berylium, magnesium, chromium, iron, nickel, copper, zinc or platinum,

$Ar_1$ to $Ar_1$ are the same as or different from each other, and each independently hydrogen; an alkyl group; a haloalkyl group; an alkylaryl group; an amine group; an arylalkenyl group unsubstituted or substituted with an alkoxy group; or an aryl group unsubstituted or substituted with a hydroxyl group, an alkyl group or an alkoxy group.

According to one embodiment, Chemical Formula 1 may be represented by the following structural formulae.

As the red fluorescent substance, compounds of the following Chemical Formula 2 may be used as the the rhodamine series.

[Chemical Formula 2]

In Chemical Formula 2, Rs are the same as or different from each other, and are hydrogen; deuterium; COO—; a substituted or unsubstituted alkyl group; a substituted or unsubstituted alkoxy group; a substituted or unsubstituted aryl group; a substituted or unsubstituted aryloxy group. When R is further substituted, the substituent may be deuterium, an alkyl group, an alkoxy group, an aryl group or an aryloxy group.

As the red fluorescent substance, compounds of the following Chemical Formula 3 may be used as the DCM series.

[Chemical Formula 3]

In Chemical Formula 3, Rs are the same as or different from each other, and are hydrogen; deuterium; a substituted or unsubstituted alkyl group; a substituted or unsubstituted alkoxy group; a substituted or unsubstituted aryl group; a substituted or unsubstituted aryloxy group. When R is further substituted, the substituent may be deuterium, an alkyl group, an alkoxy group, an aryl group or an aryloxy group.

As the red fluorescent substance, compounds of the following Chemical Formula 4 or 5 may be used as the perylenedimide series.

[Chemical Formula 4]

In Chemical Formula 4, Rs are the same as or different from each other, and are hydrogen; deuterium; a substituted or unsubstituted alkyl group; a substituted or unsubstituted alkoxy group; a substituted or unsubstituted aryl group; a substituted or unsubstituted aryloxy group. When R is further substituted, the substituent may be deuterium, an alkyl group, an alkoxy group, an aryl group or an aryloxy group.

[Chemical Formula 5]

The rhodamine series, the DCM series and the perylenedimide series described above have a FWHM of approximately 80 nm in a film state.

The red organic fluorescent substance in the color conversion film may be present in a range of 0.001 parts by weight to 2 parts by weight with respect to 100 parts by weight of the resin matrix.

In the present specification, blue light, green light and red light may use definitions known in the art, and for example, blue light is light having a wavelength selected from wavelengths of 400 nm to 500 nm, green light is light having a wavelength selected from wavelengths of 500 nm to 560 nm, and red light is light having a wavelength selected from wavelengths of 600 nm to 780 nm. In the present specification, a green fluorescent substance absorbs at least some of blue light and emits green light, and a red fluorescent substance absorbs at least some of blue light or green light and emits red light. For example, a red fluorescent substance may absorb light having a wavelength of 500 nm to 600 nm as well as blue light. As necessary, fluorescent substances emitting yellow light present between green light and red light wavelengths may also be used.

According to another embodiment of the present application, a photon number ratio of blue light and green light of light emitted from the light source when applying power to the backlight unit of the embodiments is in a range of 55:45 to 30:70. When a photon number ratio of blue light and green light is included in the above-mentioned range in the light emitted from the light source, a white color coordinate may be readily set. According to one example, a photon number ratio of blue light and green light of light emitted from the light source may be in a range of 50:50 to 30:70.

The red organic fluorescent substance has a maximum light emission wavelength in a 610 nm to 660 nm range in a film state, and has a light emission peak with a FWHM of 70 nm or less in a film state, and a pyrromethene metal complex is preferable in order to satisfy the condition.

Particularly, an effect of decreasing a FWHM of green light emitted from the light source is obtained when using a pyrromethene metal complex.

The resin matrix material is preferably a thermoplastic polymer or a thermal curing polymer. Specifically, a poly (meth)acryl-based such as polymethyl methacrylate (PMMA), a polycarbonate (PC)-based, a polystyrene (PS)-based, a polyarylene (PAR)-based, a polyurethane (TPU)-based, a styrene-acrylonitrile (SAN)-based, a polyvinylidene fluoride (PVDF)-based, a modified polyvinylidene fluoride (modified-PVDF)-based and the like may be used as the resin matrix material.

According to another embodiment of the present application, the color conversion film according to the embodiments described above further includes light diffusing particles. By dispersing light diffusing particles instead of a light diffusing film used in the art into the color conversion film for enhancing luminance, higher luminance may be obtained as well as skipping an adhering process compared to a case of using a separate light diffusing film.

As the light diffusing particles, particles having a high refractive index with the resin matrix may be used, and examples thereof include $TiO_2$, silica, borosilicate, alumina, sapphire, air or other gases, air- or gas-filled hollow beads or particles (for example, air/gas-filled glass or polymer); polystyrene, polycarbonate, polymethyl methacrylate, acryl, methyl methacrylate, styrene, a melamine resin, a formaldehyde resin, or polymer particles including melamine and formaldehyde resins, or any suitable combination thereof.

The light diffusing particles may have particle diameters in a range of 0.1 micrometers to 5 micrometers. Content of the light diffusing particles may be determined as necessary, and for example, in a 1 parts by weight to 30 parts by weight range with respect to 100 parts by weight of solid of the resin matrix.

The color conversion film according to the embodiments described above may have a thickness of 2 micrometers to 200 micrometers, for example, 2 micrometers to 100 micrometers. Particularly, the color conversion film may exhibit high luminance even with a small thickness of 2 micrometers to 20 micrometers. This is due to the fact that the content of the red organic fluorescent substance molecules included in the unit volume is higher compared to quantum dots.

The color conversion film according to the embodiments described above may have a substrate provided on one surface. This substrate may function as a support when preparing the color conversion film. Types of the substrate are not particularly limited, and the material or thickness is not limited as long as it is transparent and is capable of functioning as the support. Herein, transparency means having visible light transmittance of 70% or higher. For example, a PET film may be used as the substrate.

The color conversion film according to the embodiments described above may further include a protective film or a barrier film provided on at least one surface. An additional adhesive or gluing layer for adhering the protective film or the barrier film to the color conversion film may be provided.

The color conversion film described above may be prepared by coating a resin solution in which the red organic fluorescent substance is dissolved on a substrate and drying the result, or by extruding and filming the red organic fluorescent substance described above with a resin.

The red organic fluorescent substance is dissolved in the resin solution, and therefore, the red organic fluorescent substance is uniformly distributed in the solution. This is different from a quantum dot film preparation process that requires a separate dispersion process.

The resin solution may further include light diffusing particles and a dispersion agent for dispersing the light diffusing particles as necessary.

As for the resin solution in which the red organic fluorescent substance is dissolved, the preparation method is not particularly limited as long as the red organic fluorescent substance and the resin described above are dissolved in the solution.

According to one example, the resin solution in which the red organic fluorescent substance is dissolved may be prepared using a method of preparing a first solution by dissolving a red organic fluorescent substance in a solvent, preparing a second solution by dissolving a resin in a solvent, and mixing the first solution and the second solution. When mixing the first solution and the second solution, it is preferable that these be uniformly mixed. However, the method is not limited thereto, and a method of simultaneously adding and dissolving a red organic fluorescent substance and a resin, a method of dissolving a red organic fluorescent substance in a solvent and subsequently adding and dissolving a resin, a method of dissolving a resin in a solvent and then subsequently adding and dissolving a red organic fluorescent substance, and the like, may be used.

As the resin included in the solution, the resin matrix material described above, a monomer curable with this resin matrix, or a mixture thereof, may be used. For example, the monomer curable with the resin matrix includes a (meth) acryl-based monomer, and this may be formed to a resin matrix material by UV curing. When using such a curable monomer, an initiator required for curing may be further added as necessary.

The solvent is not particularly limited as long as it is capable of being removed by drying afterward while having no adverse effects on the coating process. Non-limiting examples of the solvent may include toluene, xylene, acetone, chloroform, various alcohol-based solvents, methylethyl ketone (MEK), methylisobutyl ketone (MIBK), ethyl acetate (EA), butyl acetate, dimethylformamide (DMF), cyclohexanone, dimethylacetamide (DMAc), dimethyl sulfoxide (DMSO), N-methyl-pyrrolidone (NMP) and the like, and one type or a mixture of two or more types may be used. When the first solution and the second solution are used, solvents included in each of the solutions may be the same as or different from each other. Even when different types of solvents are used in the first solution and the second solution, these solvents preferably has compatibility so as to be mixed with each other.

The process of coating the resin solution in which the red organic fluorescent substance is dissolved on a substrate may use a roll-to-roll process. For example, a process of unwinding a substrate from a substrate-wound roll, coating the resin solution in which the red organic fluorescent substance is dissolved on one surface of the substrate, drying the result, and then winding the result again on the roll may be carried out. When a roll-to-roll process is used, viscosity of the resin solution is preferably determined in a range capable of carrying out the process, and for example, may be determined in a range of 200 cps to 2,000 cps.

As the coating method, various known methods may be used, and for example, a die coater may be used, or various bar coating methods such as a comma coater and a reverse comma coater may be used.

After the coating, a drying process is carried out. The drying process may be carried out under a condition required to remove the solvent. For example, a color conversion film including a fluorescent substance having target thickness and concentration may be obtained on a substrate by carrying out the drying in an oven located close to a coater under a condition to sufficiently evaporate a solvent, in a direction of the substrate progressing during the coating process.

When a monomer curable with the resin matrix is used as the resin included in the solution, curing, for example, UV curing, may be carried out prior to or at the same time as the drying.

When the red organic fluorescent substance is filmed by being extruded with a resin, extrusion methods known in the art may be used, and for example, the color conversion film may be prepared by extruding the red organic fluorescent substance with a resin such as a polycarbonate (PC)-based, a poly(meth)acryl-based and a styrene-acrylonitrile (SAN)-based.

Between the light source or the light guide plate and the color conversion film, an adhesive or gluing film may be provided as necessary.

As necessary, a reflecting plate may be provided in the vicinity of the light source. In addition, a reflecting layer may be provided on a surface of a light guide plate opposite to a surface facing the color conversion film.

The backlight unit described above may be further provided with additional films such as a light diffusion film, a light concentrating film and a brightness enhancing film (DBEF). As the light concentrating film, a prism film may be used, and for example, two prism films disposed to be perpendicular to each other may be used.

Figure 9:
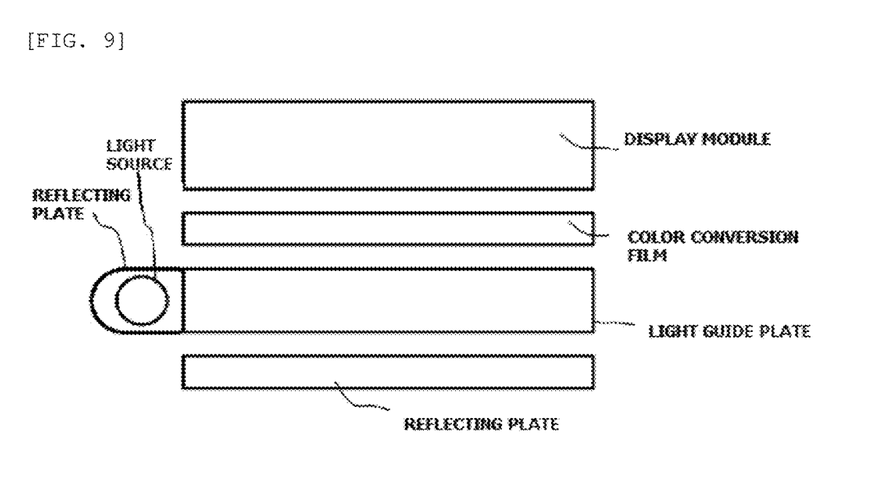
FIG. 9 is a mimetic diagram illustrating a structure of a display apparatus according to one embodiment of the present application.

According to another embodiment of the present application, a display apparatus including the back light unit described above is provided. The display apparatus is not particularly limited as long as it includes the back light unit described above as a constituent. For example, the display apparatus includes a display module and a back light unit. FIG. 9 illustrates a structure of the display apparatus. However, the structure is not limited thereto, and additional films such as a light diffusion film, a light concentrating film and a brightness enhancing film may be further provided as necessary between the display module and the back light unit.

Hereinafter, the present invention will be described in more detail with reference to examples. However, the following examples are for illustrative purposes only, and are not intended to limit the scope of the present invention thereto.

EXAMPLE 1

A red color conversion film was prepared using a red organic fluorescent substance of the following structural formula.

Figure 2:
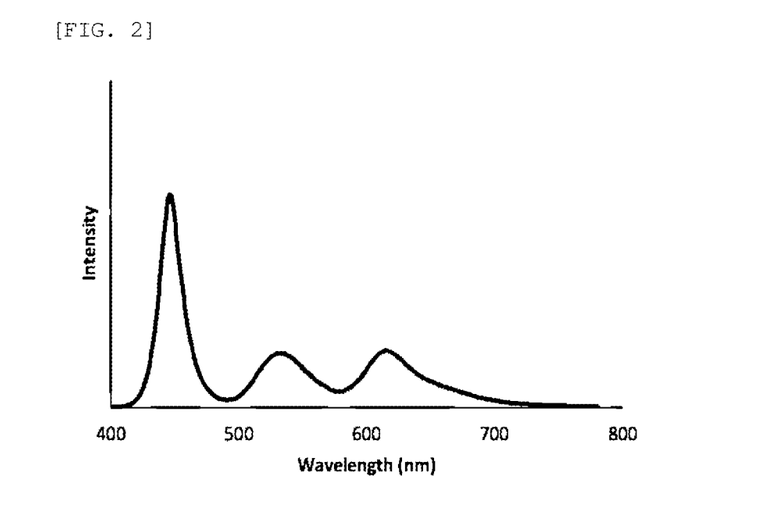
FIG. 2 to FIG. 8 are light emission spectra each measured in Examples 1 to 5 and Comparative Examples 1 and 2.

A thermoplastic resin (SAN) was dissolved in DMF, and 0.15 wt % of a red organic fluorescent substance and 10% TiO$_2$ particles with respect to solid of the resin were added thereto to prepare a coating solution, and the result was uniformly mixed. This solution was coated on a PET substrate, and the result was dried to prepare a color conversion film. A spectrum was measured by placing the red color conversion film prepared as above on a β-SiAlON series green inorganic fluorescent substance (MW540H) and a light source including a blue LED chip (blue light photon number:green light photon number=45:55), and white light was obtained. Through adjusting the content of the green inorganic fluorescent substance, the ratio of blue light photon number:green light photon number was adjusted, and the content used herein was 10 wt % with respect to solid of a sealing material. The prepared color conversion film had a maximum light emission wavelength of 615 nm and a FWHM was 49 nm. A spectrum of the film prepared in Example 1 is shown in FIG. 2. In FIG. 2, a horizontal axis represents a wavelength (nm) and a vertical axis represents radiance.

EXAMPLE 2

Figure 3:
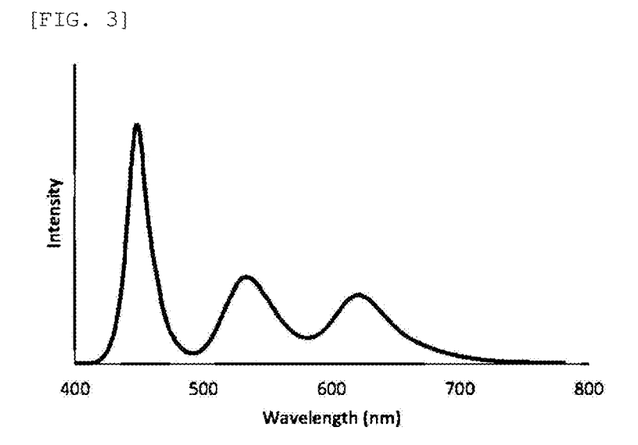

Preparation was carried out in the same manner as in
Example 1 except that a red organic fluorescent substance of the following structural formula was used, content of the green inorganic fluorescent substance was 16 wt %, and blue light photon number:green light photon number=38:62 in the light source. A spectrum of the film prepared in Example 2 is shown in FIG. 3. The prepared color conversion film had a maximum light emission wavelength of 622 nm and a FWHM of 62 nm.

EXAMPLE 3

Figure 4:
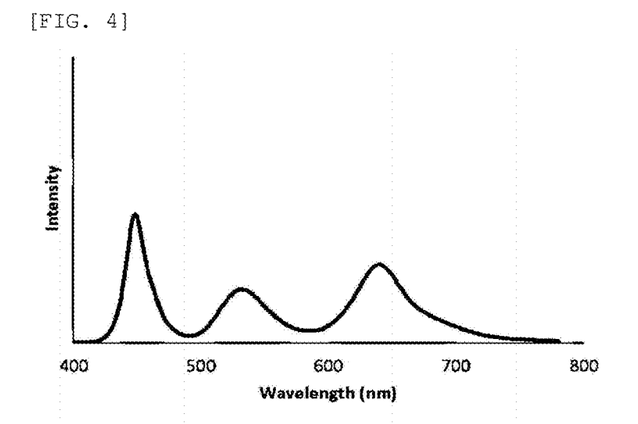

Preparation was carried out in the same manner as in Example 1 except that a TRR170 fluorescent substance of Toray Industries, Inc. was used, content of the green inorganic fluorescent substance was 21 wt %, and blue light photon number:green light photon number=30:70 in the light source. A spectrum of the color conversion film prepared in Example 3 is shown in FIG. 4. The prepared color conversion film had a maximum light emission wavelength of 640 nm and a FWHM of 49 nm.

EXAMPLE 4

Figure 5:
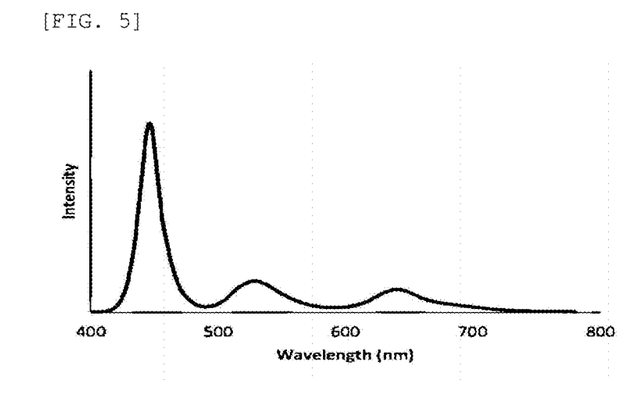

Preparation was carried out in the same manner as in Example 1 except that a TRR170 fluorescent substance of Toray Industries, Inc. was used, content of the green inorganic fluorescent substance (MW535) was 5 wt o, and blue light photon number: green light photon number=60:40 in the light source. A spectrum of the color conversion film prepared in Example 4 is shown in FIG. 5. The prepared color conversion film had a maximum light emission wavelength of 642 nm and a FWHM of 50 nm.

EXAMPLE 5

Figure 6:
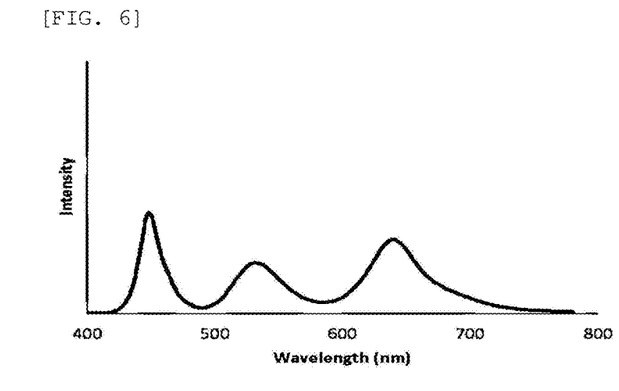

Preparation was carried out in the same manner as in Example 1 except that a TRR170 fluorescent substance of Toray Industries, Inc. was used, content of the green inorganic fluorescent substance was 22%, and blue light photon number: green light photon number=26:74 in the light source. A spectrum of the color conversion film prepared in Example 5 is shown in FIG. 6. The prepared color conversion film had a maximum light emission wavelength of 640 nm and a FWHM of 50 nm.

COMPARATIVE EXAMPLE 1

Figure 7:
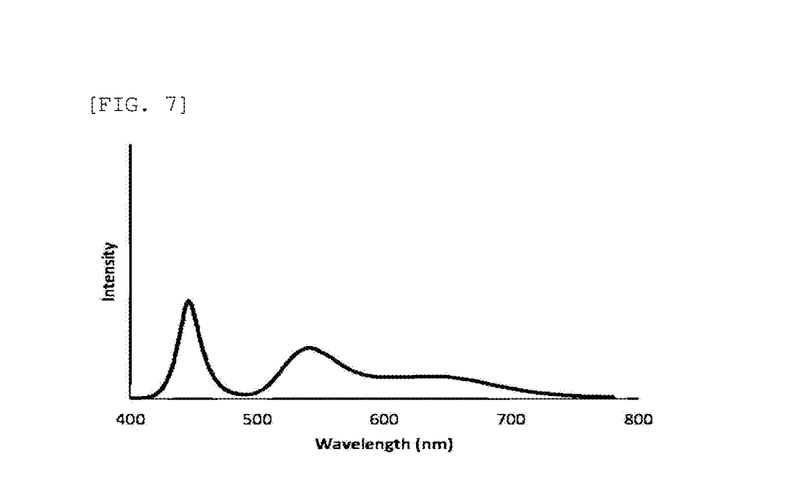

A coating solution was prepared by adding 50 wt % of a red inorganic fluorescent substance (RE306N, FWHM=93 nm) instead of an organic fluorescent substance, and 10 wt % of TiO$_2$ particles to an acryl-based UV resin, and uniformly mixing the result. A color conversion film was prepared by coating this solution on a PET substrate and UV curing the result. A spectrum was measured with the same light source (blue light photon number:green light photon number=45:55) as in Example 1, and the result is shown in FIG. 7. A red inorganic fluorescent substance has a low green light absorption rate compared to an organic fluorescent substance, and therefore, a percentage of a green photon number in the light source needs to be low in order to obtain white light.

Figure 8:
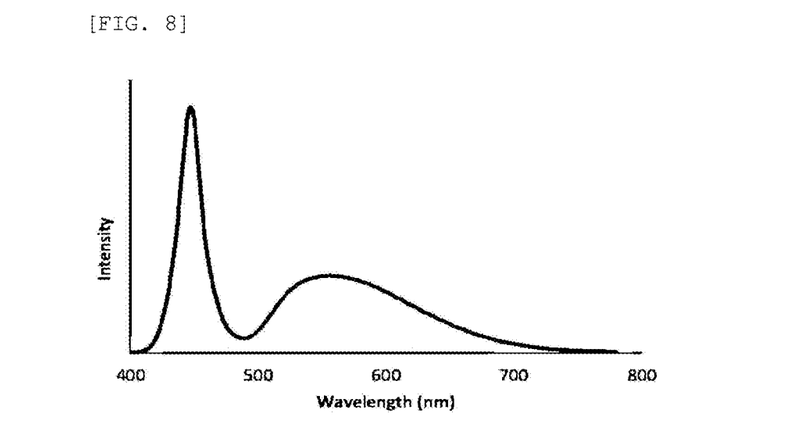

Wx/Wy and color gamut (%, based on s-RGB) of the backlight units prepared in the examples were compared with the backlight unit using a red inorganic fluorescent substance (Comparative Example 1) and the backlight unit including a white LED light source including a YAG fluorescent substance, and not including a red color conversion film (Comparative Example 2), and the results are listed in the following Table 1. Light emission spectrum of the backlight unit including a white LED light source including a YAG fluorescent substance is shown in FIG. 8.

TABLE 1

| | Example 1 | Example 2 | Example 3 | Example 4 | Example 5 | Comparative Example 1 | Comparative Example 2 |
|---|---|---|---|---|---|---|---|
| Photon Number Ratio of Light Source (B:G) | 45:55 | 38:62 | 30:70 | 60:40 | 26:74 | 45:55 | W-LED |

TABLE 1-continued

|  | Example 1 | Example 2 | Example 3 | Example 4 | Example 5 | Comparative Example 1 | Comparative Example 2 |
|---|---|---|---|---|---|---|---|
| Wx/Wy | 0.30/0.28 | 0.30/0.32 | 0.31/0.29 | 0.22/0.21 | 0.34/0.35 | 0.31/0.38 | 0.31/0.33 |
| Color Gamut (%, Based on s-RGB) | 125% | 122% | 137% | 146% | 127% | 113% | 106% |

According to Table 1, the examples using an organic fluorescent substance had excellent color gamut compared to the comparative examples, and particularly, Wx/Wy of the backlight unit was able to be set to a target color coordinate when the photon number ratio of the light source was in a range of 55:45 to 30:70.

The invention claimed is:

1. A backlight unit comprising:
a light source including a light emission lamp emitting light including a 450 nm wavelength, and an inorganic fluorescent substance provided at least a part of inside or on a surface of the lamp and having a maximum light emission wavelength in a 510 nm to 560 nm range when irradiating light including a 450 nm wavelength; and
a color conversion film including an organic fluorescent substance, and having a maximum light emission wavelength in a 610 nm to 660 nm range when irradiating light emitted from the light emission lamp or the inorganic fluorescent substance,
wherein a photon number ratio of blue light and green light of light emitted from the light source when applying power to the backlight unit is in a range of 55:45 to 30:70, and
wherein the organic fluorescent substance is at least one selected from the group consisting of a compound of Chemical Formula (1), a compound of Chemical Formula (2), a compound of Chemical Formula (3), a compound of Chemical Formula (4), and a compound of Chemical Formula (5):

[Chemical Formula 1]

wherein $R_{11}$, $R_{12}$ and L are the same as or different from each other, and each independently is hydrogen, an alkyl group, a cycloalkyl group, an aralkyl group, an alkylaryl group, an alkenyl group, a cycloalkenyl group, an alkynyl group, a hydroxyl group, a mercapto group, an alkoxy group, an alkoxyaryl group, an alkylthio group, an arylether group, an arylthioether group, an aryl group, a haloaryl group, a heteroring group, halogen, a haloalkyl group, a haloalkenyl group, a haloalkynyl group, a cyano group, an aldehyde group, a carbonyl group, a carboxyl group, an ester group, a carbamoyl group, an amino group, a nitro group, a silyl group or a siloxanyl group, or are linked to adjacent substituents to form a substituted or unsubstituted aromatic or aliphatic hydrocarbon ring or heteroring,
M is a metal having a valency of m, and is boron, berylium, magnesium, chromium, iron, nickel, copper, zinc or platinum,
$Ar_1$ to $Ar_5$ are the same as or different from each other, and each independently is hydrogen; an alkyl group; a haloalkyl group; an alkylaryl group; an amine group; an arylalkenyl group unsubstituted or substituted with an alkoxy group; or an aryl group unsubstituted or substituted with a hydroxyl group, an alkyl group or an alkoxy group;

[Chemical Formula 2]

wherein $R_{21}$ to $R_{26}$ are the same as or different from each other, and each independently is hydrogen; deuterium; COO—; a substituted or unsubstituted alkyl group; a substituted or unsubstituted alkoxy group; a substituted or unsubstituted aryl group; a substituted or unsubstituted aryloxy group, with the proviso that when any of $R_{21}$ to $R_{26}$ is further substituted, the substituent may be deuterium, an alkyl group, an alkoxy group, an aryl group or an aryloxy group;

[Chemical Formula 3]

wherein $R_{31}$ to $R_{33}$ are the same as or different from each other, and each independently is hydrogen; deuterium; a substituted or unsubstituted alkyl group; a substituted or unsubstituted alkoxy group; a substituted or unsubstituted aryl group; a substituted or unsubstituted aryloxy group, with the proviso that when any of $R_{31}$ to $R_{33}$ is further substituted, the substituent may be deuterium, an alkyl group, an alkoxy group, an aryl group or an aryloxy group;

[Chemical Formula 5]

[Chemical Formula 4]

wherein $R_{41}$ to $R_{44}$ are the same as or different from each other, and are hydrogen; deuterium; a substituted or unsubstituted alkyl group; a substituted or unsubstituted alkoxy group; a substituted or unsubstituted aryl group; a substituted or unsubstituted aryloxy group, with the proviso that when any of $R_{41}$ to $R_{44}$ is further substituted, the substituent may be deuterium, an alkyl group, an alkoxy group, an aryl group or an aryloxy group;

2. The backlight unit of claim 1, wherein a photon number ratio of blue light and green light of light emitted from the light source when applying power to the backlight unit is in a range of 50:50 to 30:70.

3. The backlight unit of claim 1, wherein the organic fluorescent substance has a light emission peak with a full width at half maximum of 70 nm or less in a film state.

4. The backlight unit of claim 1, wherein a light guide plate is provided between the light source and the color conversion film.

5. The backlight unit of claim 1, further comprising at least one of a light diffusing film, a light concentrating film and a brightness enhancing film provided on a surface of the color conversion film opposite to a surface facing the light source.

6. The backlight unit of claim 1, further comprising a reflecting plate provided on a surface of the light source opposite to a surface facing the color conversion film.

7. The backlight unit of claim 1, wherein the color conversion film includes a resin matrix; and the organic fluorescent substance is dispersed in the resin matrix.

8. A display apparatus comprising the backlight unit of claim 1.

* * * * *